United States Patent [19]

Ishida et al.

[11] Patent Number: 5,831,720
[45] Date of Patent: Nov. 3, 1998

[54] VELOCIMETER, SIGNAL PROCESSING METHOD, AND DRIVING SYSTEM USING THE SAME

[75] Inventors: Yasuhiko Ishida, Suginami-ku; Makoto Takamiya, Tokyo, both of Japan

[73] Assignee: Canon Kabushiki Kaisha, Tokyo, Japan

[21] Appl. No.: 734,542

[22] Filed: Oct. 21, 1996

[30] Foreign Application Priority Data

Oct. 23, 1995 [JP] Japan ................................... 7-274146

[51] Int. Cl.⁶ ........................................................ G01P 3/36
[52] U.S. Cl. .............................................................. 356/28.5
[58] Field of Search ............................................. 356/28.5

[56] References Cited

U.S. PATENT DOCUMENTS

| | | | |
|---|---|---|---|
| 3,915,572 | 10/1975 | Orloff ..................................... | 356/28.5 |
| 4,167,329 | 9/1979 | Jelalain et al. .......................... | 356/28.5 |
| 4,413,905 | 11/1983 | Holzapfel ................................ | 356/5 |
| 5,229,830 | 7/1993 | Ishida et al. ............................ | 356/28.5 |
| 5,483,332 | 1/1996 | Takamiya et al. ...................... | 356/28.5 |
| 5,502,466 | 3/1996 | Kato et al. ............................... | 356/356 |
| 5,589,858 | 12/1996 | Kadowaki et al. ..................... | 356/28.5 |
| 5,696,578 | 12/1997 | Ishida et al. ............................ | 356/28.5 |

*Primary Examiner*—Stephen C. Buczinski
*Attorney, Agent, or Firm*—Fitzpatrick, Cella, Harper & Scinto

[57] ABSTRACT

A velocimeter includes a light source for irradiating light onto an object to be measured, a light-receiving element for receiving scattered light from the object and outputting a light-receiving signal upon receiving the scattered light, a signal processing circuit for obtaining velocity information of the object to be measured by performing signal processing of the light-receiving signal output from the light-receiving element, a bandpass filter arranged in the signal processing circuit and having a function of passing frequency components near the frequency of the light-receiving signal to be obtained when the object to be measured is in a still state, and a switch arranged in the signal processing circuit to activate the bandpass filter substantially in the signal processing circuit when the moving velocity of the object to be measured is low.

15 Claims, 4 Drawing Sheets

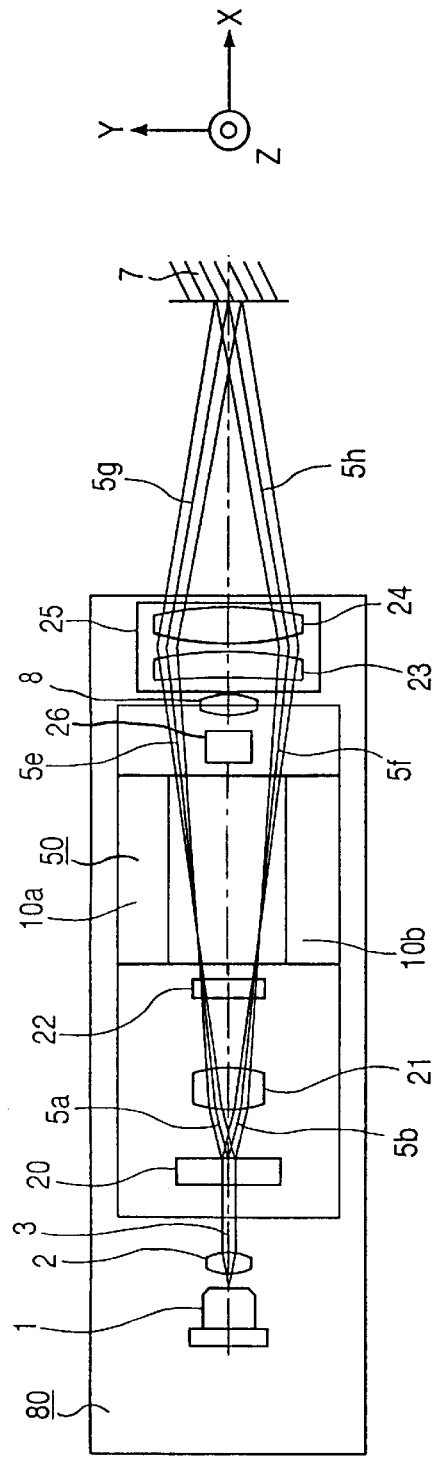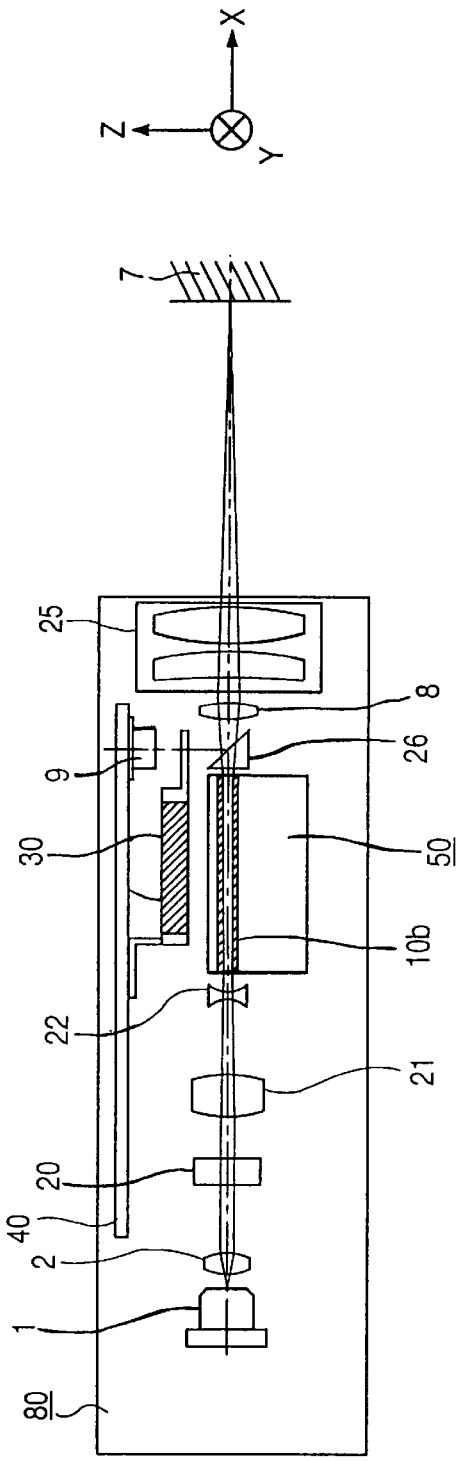

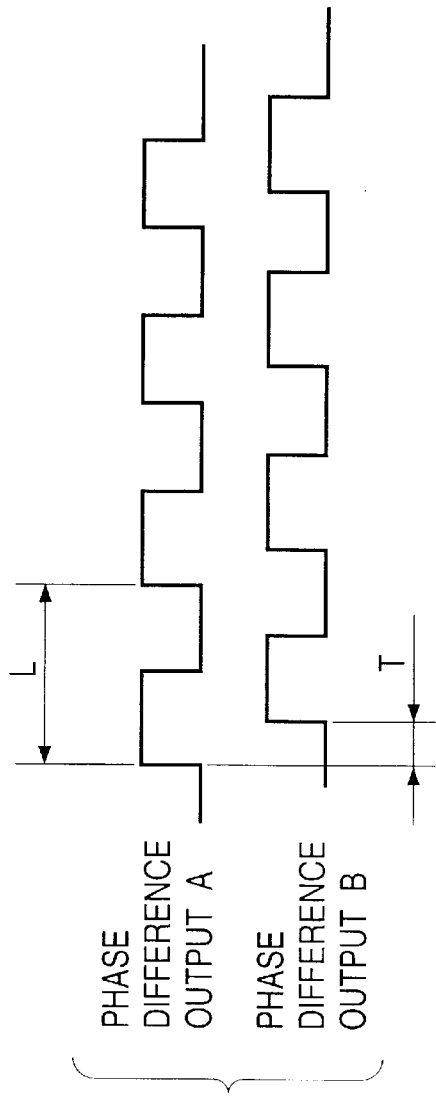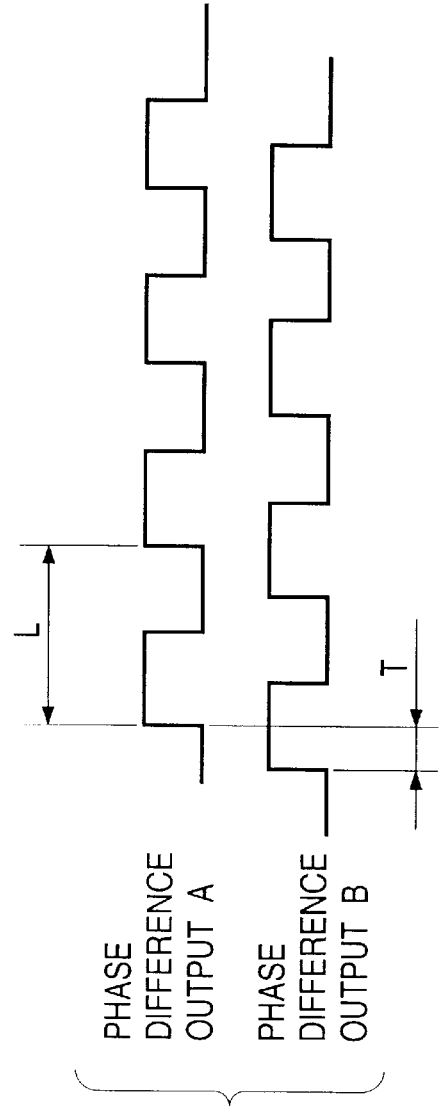

VELOCIMETER, SIGNAL PROCESSING METHOD, AND DRIVING SYSTEM USING THE SAME

BACKGROUND OF THE INVENTION

1. Field of the Invention

The present invention relates to a Doppler velocimeter for measuring the moving velocity, moving distance, and the like of a moving object, fluid, or the like with high precision in a non-contact manner, a signal processing system used for the Doppler velocimeter, and a driving system using the same and, more particularly, to a Doppler velocimeter for irradiating light onto an object to be measured and executing measurements on the basis of the Doppler shift of light scattered by the object, a signal processing method, and a driving system and method using the same.

2. Related Background Art

Conventionally, as a device for measuring the displacement information of an object with high precision in a non-contact manner, a Doppler velocimeter is used. The Doppler velocimeter irradiates coherent light such as a laser beam onto a moving object or fluid, and measures the moving velocity of the moving object or fluid by utilizing an effect that the frequency of light scattered by the moving object or fluid shifts in proportion to the moving velocity (Doppler effect).

The conventional Doppler velocimeter suffers the following problems.

1. When the object to be measured moves at a very low velocity or stands still, a state wherein the level of a Doppler signal drops and the S/N ratio is impaired continues for a long period of time depending on the surface state of the object to be measured. Even in such case, it is required to obtain more sufficient measurement precision.

2. The output signal from the Doppler velocimeter is a pulse output proportional to the velocity. In order to handle a case wherein a circuit equivalent to a conventional encoder output is used, a device that can be used for a simple counter device used for distance measurements including the moving direction is required.

3. When the optical system is constituted using a lens system so that the detection wavelength is hardly influenced by variations in wavelength even when the wavelength of a light source such as a semiconductor laser is unstable upon irradiating a light beam onto the object to be measured, generation of spherical aberration by the lens system must be taken into consideration.

SUMMARY OF THE INVENTION

It is the first object of the present invention to provide a velocimeter which can realize high-precision measurements that can solve the above-mentioned problems, a signal processing method, and a driving system and method using the same.

Other objects of the present invention will become apparent from the following description of the embodiments.

BRIEF DESCRIPTION OF THE DRAWINGS

FIGS. 1A and 1B are respectively a top sectional view and a front sectional view showing the optical arrangement according to the first embodiment of the present invention;

FIGS. 3A and 3B are charts for explaining phase difference outputs A and B; and

DESCRIPTION OF THE PREFERRED EMBODIMENTS

Figure 2:
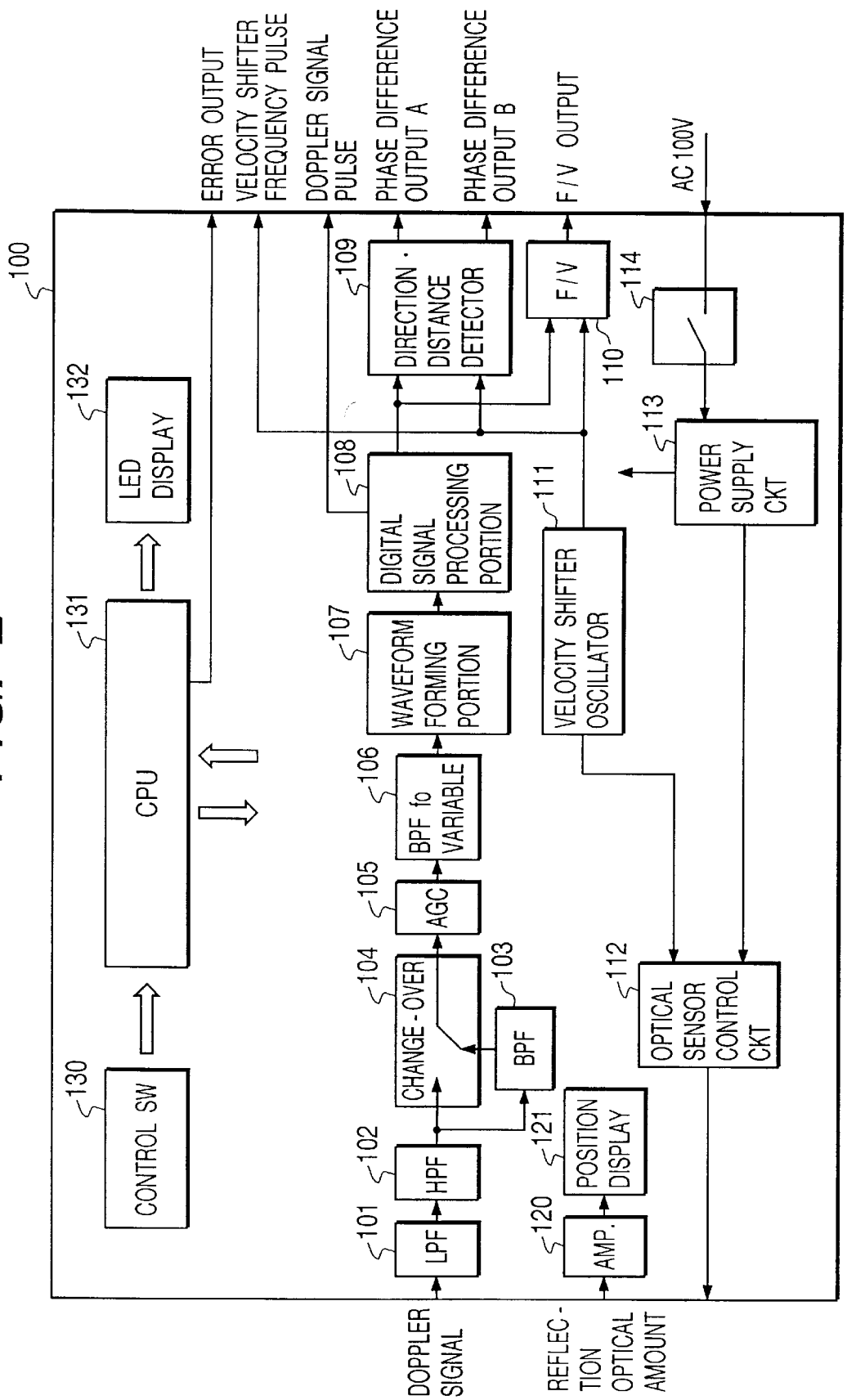
FIG. 2 is a block diagram of a signal processing unit in a Doppler velocimeter in the first embodiment.

FIGS. 1A and 1B show the optical arrangement of a laser Doppler velocimeter according to the first embodiment of the present invention. FIG. 1A is a top sectional view and FIG. 1B is a front sectional view.

In FIGS. 1A and 1B, an optical head unit (optical sensor) 80 of the laser Doppler velocimeter has the following arrangement. A laser diode 1 is arranged, so that a laser beam emitted from the laser diode 1 becomes linearly polarized light along the Z-axis. The laser beam is converted into a collimated light beam 3 via a collimator lens 2. The collimated light beam 3 is split into two light beams 5a and 5b at a diffraction angle θ by a diffraction grating 20, the grating layout direction of which agrees with the Y-axis direction, and which has a grating pitch d.

At this time, the diffraction angle θ is given by:

$$d\sin\theta = \lambda \quad (1)$$

The light beams 5a and 5b are transmitted through a first lens 21 and are converted into condensed light beams, and the condensed light beams are converted by a cylindrical lens 22 into substantially collimated light beams that are collimated in only the Z-axis direction (in the X-Z plane). The collimated light beams then are incident on a frequency shifter 50 constituted by electro-optic crystals 10a and 10b.

The electro-optic crystals 10a and 10b are arranged so that their crystallographic axes are parallel to the Z-direction and have opposite directions, and are sandwiched between common electrodes (not shown) disposed on both sides in the Z-direction. Electro-optic crystals 10a and 10b and are concurrently applied with sawtooth, periodic electric fields in the same direction (serrodyne driven). With these electric fields, the two light beams undergo frequency shifts in opposite directions, and a frequency difference is generated between the two light beams.

Since the light beams enter the electro-optic crystals 10a and 10b as substantially collimated light beams with a small beam size in the X-Z plane upon operation of the first lens 21 and the cylindrical lens 22, even when the beam size of the collimated light beam 3 is increased, the light beams can be transmitted through the low-profile electro-optic crystals 10a and 10b without being eclipsed, and the frequency shifter can be realized by a low application voltage.

After the two light beams emerge from the frequency shifter 50, they are refracted by a second lens group 25 consisting of lenses 23 and 24, and are irradiated onto an object 7 to be measured at an angle θ' of incidence (crossing angle 2θ'), so that the object 7 is illuminated at the crossing position of the two light beams.

Note that the first lens 21 and the second lens group 25 constitute an afocal optical system having a magnification m in the X-Y plane, and are designed to satisfy the relation below, so that the spherical aberration generated by the first lens 21 is canceled by the second lens group 25:

$$\sin\theta/\sin\theta' = m \quad (2)$$

In particular, in order to finally cancel the aberrations generated by the first lens 21 using a biconvex lens and the second lens group 25 including the biconvex lens 24, the lens 23 comprises a meniscus lens. With this arrangement, in the X-Y plane, the two light beams become incident on the object 7 to be measured as collimated light. On the other hand, in the X-Z plane, the two light beams are converged on the object 7 to be measured due to the effect of the cylindrical lens 22.

Since light beams 5g and 5h that emerge from the second lens group 25 are focused light beams, each of their profiles becomes an ellipse with a considerably high flatness. Hence, since the detection region of a measurement signal is broadened by increasing the beam size in the velocity detection direction (Y-direction), and generation of noise signals from other regions is prevented by reducing the beam size in a direction perpendicular thereto (Z-direction), the S/N ratio of the signal can also be improved.

Light irradiated onto and scattered by the object 7 to be measured is transmitted through the second lens group 25 and a focusing lens 8, and is returned by a reflection prism 26. Then, the light is detected by a photodetector 9.

The light beams 5g and 5h are given a frequency difference fR therebetween via the frequency shifter 50, and the Doppler frequency, F, of scattered light from the object 7 to be measured is expressed by equation (3) below using the frequency difference fR between the two light beams:

$$F = 2V\sin\theta/\lambda + fR \quad (3)$$

Therefore, even when the velocity, V, of the object 7 to be measured is low, if fR is set to be have an appropriate value, a sufficiently large frequency difference from low-frequency components owing to the flow of a speckle pattern or changes in transmittance (or reflectance) of the object to be measured can be assured, and low-velocity detection can be realized upon extracting only a Doppler signal by electrically removing the low-frequency components using, e.g., a filter, as will be described later.

From equations (1), (2), and (3) above, the obtained beat signal (Doppler frequency) of light including velocity information is given by:

$$F = 2V/md + fR \quad (4)$$

A tuning fork vibrator 30 is used to prevent a signal from continuously dropping out in nearly a still state, and is integrally arranged on a circuit board 40, so that its distal end shields a portion of the optical path to the photodetector 9. The vibrator 30 vibrates at a mechanical resonance frequency by a self resonance circuit. In the presence of these vibrations, the detection position on the object 7 to be measured, of light beams incident on the photodetector 9, and the detection direction from the object 7 to be measured periodically change. Therefore, a Doppler signal can be detected in any state during one cycle of the vibration, and consequently, a signal can be prevented from continuously dropping out. The mechanical resonance frequency of the tuning fork vibrator 30 is designed to be electrically removed by a filter (to be described later).

FIG. 2 is a block diagram showing a signal processing unit 100 of this embodiment.

Referring to FIG. 2, a low-pass filter (LPF) 101 and a high-pass filter (HPF) 102 cut noise components from the detection signal (Doppler signal) output from the photodetector 9. A first bandpass filter (BPF) 103 receives the output from the HPF 102, and its center frequency matches the frequency (i.e., fR) of the Doppler signal when the object to be measured stands still.

A change-over switch (SW) 104 changes over the input to a variable gain amplifier (AGC) 105 between the outputs from the HPF 102 and the BPF 103 in correspondence with a command from an internal CPU 131. The AGC 105 amplifies the Doppler signal to a predetermined level.

The center frequency of a second band-pass filter (BPF) 106 changes so as to follow the frequency of the Doppler signal output from the AGC 105 under the control of the CPU 131.

A waveform forming portion 107 binarizes the output from the BPF 106 to Hi and Lo levels of a digital signal. A digital signal processing portion 108 interpolates dropouts generated in the Doppler signal output from the waveform forming portion 107 to obtain a Doppler signal having a continuous rectangular wave.

A direction and distance detector 109 compares the Doppler signal output from the digital signal processing portion 108 with a cyclic signal from a velocity shifter oscillator 111 which outputs the cyclic signal having the frequency fR as the shift frequency to the frequency shifter 50 (via a control circuit to be described later), and externally outputs phase difference outputs A and B on the basis of the moving direction information and distance information of the object 7 to be measured obtained from the frequency difference therebetween. The outputs A and B will be described in detail later.

An F/V converter 110 externally outputs a voltage corresponding to the moving direction information and velocity information of the object to be measured obtained upon comparing the outputs from the digital signal processing portion 108 and the velocity shifter oscillator 111.

A control circuit 112 controls to turn on/off the laser diode 1 in the optical sensor 80, and supplies a shifter signal and a circuit power supply signal to the frequency shifter 50. A power supply SW 114 of the device is connected to a power supply circuit 113, which supplies a stable power supply voltage from an AC power supply to the control circuit 112 and other circuits in the signal processing unit 100.

An amplifier 120 amplifies and outputs only signal components corresponding to the reflection optical amount (DC components) of the signal output from the photodetector 9. A position display 121 displays an optimal setting position (maximum reflection optical amount position) of the optical sensor 80 on the basis of the signal corresponding to the reflection optical amount output from the amplifier 120.

A control SW 130 is used by an operator to turn on/off the laser and to change over the display unit of velocity. The input contents from the control SW 130 are transmitted to the CPU 131. The CPU 131 receives information from the respective portions in the signal processing unit 100, controls these portions, and outputs an error output depending on the measurement condition. An LED display 132 displays the measurement condition and the velocity of the object to be measured (on the basis of the output transmitted from the digital signal processing portion 108 to the CPU 131) in accordance with the output from the CPU 131.

Note that some signal components of the Doppler signal pulse from the digital signal processing portion 108 and the velocity shifter frequency pulse signal from the velocity shifter oscillator 111 are respectively directly output to an external circuit.

The operation and control of the BPF 103 and the change-over SW 104 in the signal processing unit 100 with the above arrangement will be described in detail below.

The CPU 131 calculates the velocity of the object to be measured on the output from the digital signal processing portion 108 at predetermined intervals. When the absolute value of the velocity of the object to be measured becomes equal to or lower than a predetermined velocity (velocity 1), the CPU 131 switches the change-over SW 104 to receive the output from the BPF 103; when the absolute value of the velocity of the object to be measured becomes equal to or higher than a predetermined velocity (velocity 2), the CPU 131 switches the change-over SW 104 to receive the output from the HPF 102. Note that velocities 1 and 2 satisfy velocity 1<velocity 2.

When the BPF 103 is inserted before the AGC 105 to filter the input signal more strictly in a state wherein the frequency of the velocity signal represents a relatively low velocity, the S/N ratio of the input signal to the AGC 105 can be improved. Therefore, the AGC can operate based on only signal components essentially required for signal processing, and the measurement precision at a low velocity or a still state can be improved.

The direction and distance detector 109 will be described in more detail below.

The direction and distance detector 109 outputs a pair of phase difference outputs A and B, from which the direction and moving distance can be calculated, on the basis of the moving direction information and moving distance information obtained from the frequency F of the Doppler signal output from the signal processing portion 108, which signal includes both the frequency component generated by the velocity shifter and the velocity component of the object 7 to be measured, and the velocity shifter frequency component fR.

The relationship between the phase difference outputs A and B will be explained below with reference to FIGS. 3A and 3B. FIG. 3A shows a case wherein the moving direction of the object to be measured is positive, the phase of the phase difference output A leads that of the phase difference output B by T, and one pulse is output every moving distance L. FIG. 3B shows a case wherein the moving direction of the object to be measured is negative, the phase of the phase difference output A lags behind that of the phase difference output B by T, and one pulse is output every moving distance L. In this manner, the phase difference relationship between the phase difference outputs A and B is switched in correspondence with the moving direction of the object 7 to be measured, as shown in FIGS. 3A and 3B.

More specifically, the phase difference outputs A and B are generated based on the output from an UP/DOWN counter in such a manner that UP/DOWN pulses indicating the direction and moving distance are generated on the basis of the Doppler signal F and the velocity shifter frequency component fR, and are input to the UP/DOWN counter.

These output signals comply with A- and B-phase output signals of an encoder that measures the rotation or moving distance, and a counter for a general encoder can be used to measure the moving distance without any modifications.

Figure 4:
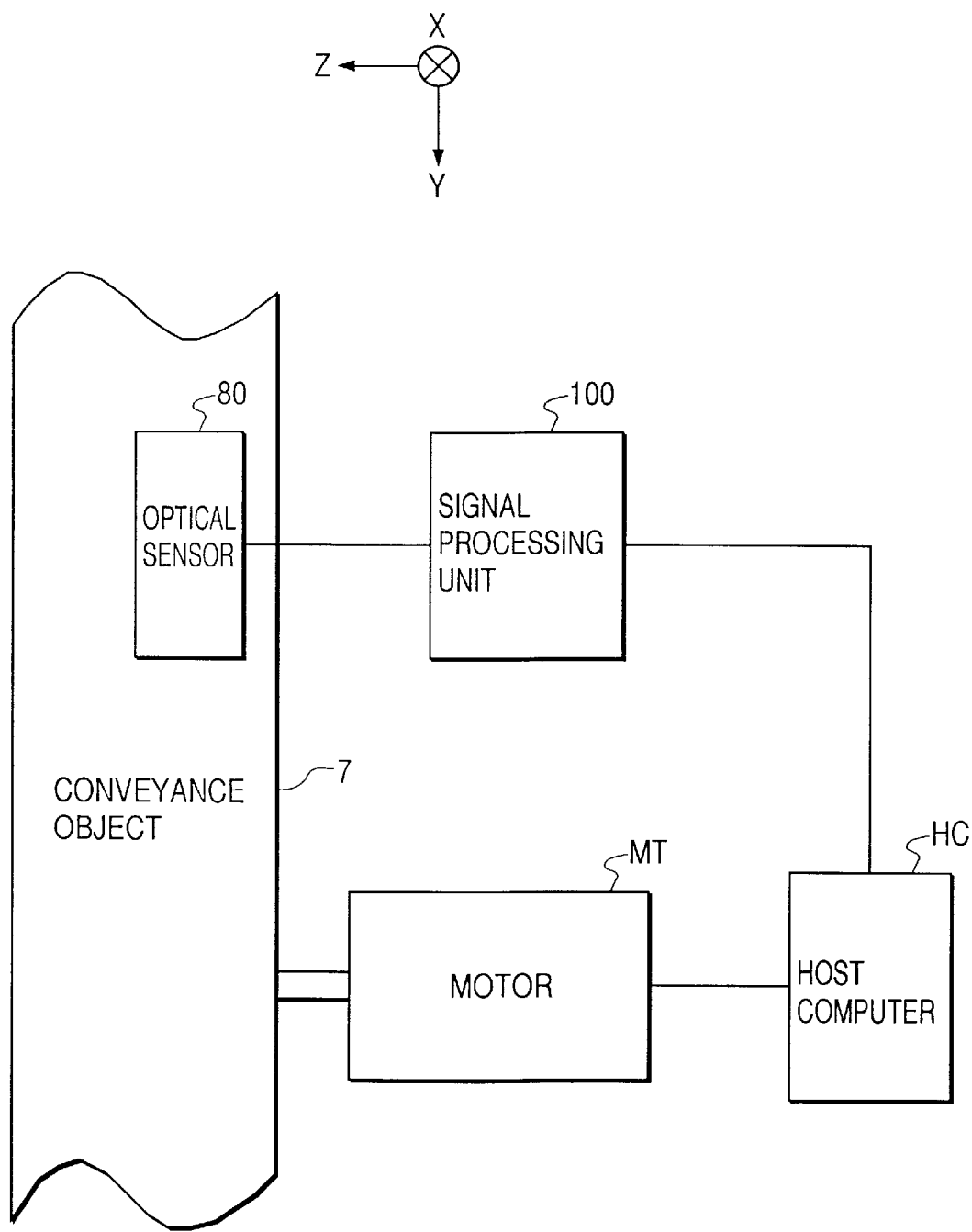
FIG. 4 is a schematic explanatory view of the second embodiment.

FIG. 4 is a schematic explanatory view of the second embodiment of the present invention. This embodiment will exemplify a driving apparatus that adopts the device of the first embodiment in a driving system.

In FIG. 4, the optical sensor 80 and the signal processing unit 100 have the same arrangement as that in the first embodiment. A host computer HC includes a counter for counting phase difference signals A and B from the signal processing unit 100, and issues a driving command signal in accordance with a program on the basis of the obtained moving direction information and moving distance information. The driving command signal from the host computer HC is transmitted to a driving motor MT that incorporates a motor driver circuit. The motor MT conveys a conveyance object 7 as an object to be measured via a conveyance mechanism (not shown) on the basis of the input command.

In this case, the system is arranged so that the surface of the conveyance object 7 is detected by the optical sensor 80.

With the above arrangement, accurate constant-velocity conveyance control and positioning control of the conveyance object 7 can be realized.

As the change-over SW 104, a circuit that detects the frequency difference between the outputs from the digital signal processing portion 108 and performs the above-mentioned change-over control upon detecting a frequency difference corresponding to velocity 1 or 2 above may be added in place of the circuit that operates in accordance with a command from the CPU. In place of inserting the BPF 103 in the processing circuit via the change-over SW 104, the BPF 103 may have variable characteristics, and may be permanently built in the processing circuit. More specifically, the BPF 103 normally has broad frequency-band characteristics, and only when the object to be measured is in a low-velocity state near a still state, the characteristics of the BPF 103 may be changed to pass frequency components near that of the Doppler signal.

The direction and distance detector 109 may perform signal processing in accordance with a predetermined program to output phase difference outputs A and B.

The above-mentioned embodiments have the following advantages.

1. When the moving velocity of the object to be measured is low, the bandpass filter that passes frequency components near the frequency of a light-receiving signal to be obtained in a still state of the object to be measured is activated in the signal processing circuit, thereby improving measurement precision required when the object to be measured stands still or moves at a low velocity.

2. Since a pair of cyclic signals, which output pulses every predetermined moving distance of the object to be measured and have a phase difference, the direction of which is reversed in correspondence with the moving direction of the object to be measured, are output, a counter used in an existing encoder or the like can be used, and a system for measuring the distance including the moving direction even from a still state can be easily constituted.

3. Since the second lens group has a combination of a meniscus lens and a biconvex lens, aberrations generated by the afocal system consisting of two lens groups having different focal lengths can be removed, and more accurate measurement can be assured.

What is claimed is:

1. A velocimeter comprising:

a light source for irradiating light onto an object to be measured;

a light-receiving element for receiving scattered light from the object to be measured irradiated with the light, said light-receiving element outputting a light-receiving signal upon receiving the scattered light;

a signal processing circuit for obtaining velocity information of the object to be measured by performing signal processing of the light-receiving signal output from said light-receiving element;

a bandpass filter arranged in said signal processing circuit, said bandpass filter having a function of passing frequency components near a frequency of the light-receiving signal to be obtained when the object to be measured is in a still state; and a switch arranged in said signal processing circuit, said switch activating said bandpass filter substantially in said signal processing circuit when a moving velocity of the object to be measured is low.

2. A velocimeter according to claim 1, wherein said signal processing circuit comprises a variable gain amplifier, and said switch inserts said bandpass filter in front of said variable gain amplifier when the moving velocity of the object to be measured is low.

3. A driving system comprising:

a drive system for driving an object to be driven;

a light source for irradiating light onto the object to be driven;

a light-receiving element for receiving scattered light from the object to be driven irradiated with the light, said light-receiving element outputting a light-receiving signal upon receiving the scattered light;

a signal processing circuit for obtaining velocity information of the object to be driven by performing signal processing of the light-receiving signal output from said light-receiving element;

a control system for controlling a driving operation of said drive system on the basis of the velocity information obtained by said signal processing circuit;

a bandpass filter arranged in said signal processing circuit, said bandpass filter having a function of passing frequency components near a frequency of the light-receiving signal to be obtained when the object to be driven is in a still state; and a switch arranged in said signal processing circuit, said switch activating said bandpass filter substantially in said signal processing circuit when a moving velocity of the object to be driven is low.

4. A signal processing method for obtaining velocity information of an object to be measured by performing signal processing of a light-receiving signal of scattered light obtained by irradiating light onto the object to be measured., comprising:

the first step of obtaining the velocity information of the object to be measured by performing the signal processing of the light-receiving signal using a signal processing circuit; and the second step of activating a bandpass filter having a function of passing frequency components near a frequency of the light-receiving signal to be obtained when the object to be driven is in a still state, substantially in said signal processing circuit when a moving velocity of the object to be measured is low.

5. A method according to claim 4, wherein the second step includes the step of inserting said bandpass filter in front of a variable gain amplifier in said signal processing circuit when the moving velocity of the object to be measured is low.

6. A velocimeter comprising:

a light source for irradiating light onto an object to be measured;

a light-receiving element for receiving scattered light from the object to be measured irradiated with the light, said light-receiving element outputting a light-receiving signal upon receiving the scattered light; and a signal processing circuit for performing signal processing of the light-receiving signal output from said light-receiving element, said signal processing circuit outputting a pair of cyclic signals that generate pulses every predetermined moving distance of the object to be measured, the pair of cyclic signals having a phase difference therebetween and a direction of the phase difference being reversed in correspondence with a moving direction of the object to be measured.

7. A velocimeter according to claim 6, wherein the pair of cyclic signals correspond to A- and B-phase outputs.

8. A driving system comprising:

a drive system for driving an object to be driven;

a light source for irradiating light onto the object to be driven;

a light-receiving element for receiving scattered light from the object to be driven irradiated with the light, said light-receiving element outputting a light-receiving signal upon receiving the scattered light;

a signal processing circuit for performing signal processing of the light-receiving signal output from said light-receiving element, said signal processing circuit outputting a pair of cyclic signals that generate pulses every predetermined moving distance of the object to be driven, the pair of cyclic signals having a phase difference therebetween and a direction of the phase difference being reversed in correspondence with a moving direction of the object to be driven; and a control system for controlling a driving operation of said drive system on the basis of velocity information obtained by said signal processing circuit.

9. A signal processing method for obtaining velocity information of an object to be measured by performing signal processing of a light-receiving signal of scattered light obtained by irradiating light onto the object to be measured, comprising:

the first step of performing the signal processing of the light-receiving signal using a signal processing circuit; and the second step of outputting a pair of cyclic signals that generate pulses every predetermined moving distance of the object to be measured, the pair of cyclic signals having a phase difference therebetween and a direction of the phase difference being reversed in correspondence with a moving direction of the object to be measured.

10. A method according to claim 9, wherein the pair of cyclic signals correspond to A- and B-phase outputs.

11. A velocimeter comprising:

a light source;

a diffraction grating for splitting light emitted by said light source into two light beams;

a lens system for crossing and irradiating the two light beams onto an object to be measured, said lens system having an afocal lens system consisting of first and second lens groups, the second lens group having a combination of a meniscus lens and a biconvex lens; and a light-receiving element for receiving scattered light from the object to be measured irradiated with the two light beams, velocity information of the object to be measured being able to be obtained based on the light received by said light-receiving element.

12. A velocimeter according to claim 11, further comprising:

a signal processing circuit for obtaining the velocity information of the object to be measured by performing signal processing of a light-receiving signal output from said light-receiving element;

a bandpass filter arranged in said signal processing circuit, and having a function of passing frequency components near a frequency of the light-receiving signal to be obtained when the object to be measured is in a still state; and a switch arranged in said signal processing circuit, and adapted to activate said bandpass filter substantially in said signal processing circuit when a moving velocity of the object to be measured is low.

13. A velocimeter according to claim 11, further comprising a signal processing circuit for performing signal processing of the light-receiving signal output from said light-receiving element, said signal processing circuit outputting a pair of cyclic signals that generate pulses every predetermined moving distance of the object to be measured, the pair of cyclic signals having a phase difference therebetween and a direction of the phase difference being reversed in correspondence with a moving direction of the object to be measured.

14. A driving system comprising:

a drive system for driving an object to be driven;

a light source;

a diffraction grating for splitting light outgone from said light source into two light beams;

a lens system for crossing and irradiating the two light beams onto an object to be driven, said lens system having an afocal lens system consisting of first and second lens groups, the second lens group having a combination of a meniscus lens and a biconvex lens; and a light-receiving element for receiving scattered light from the object to be driven irradiated with the two light beams; and a control system for controlling a driving operation of said drive system on the basis of an output from said light-receiving element.

15. A velocity measurement method comprising:

the first step of splitting light outgone from a light source into two light beams using a diffraction grating;

the second step of crossing and irradiating the two light beams onto an object to be measured using a lens system, said lens system having an afocal lens system consisting of first and second lens groups, the second lens group having a combination of a meniscus lens and a biconvex lens; and the third step of receiving scattered light from the object to be measured irradiated with the two light beams, velocity information of the object to be measured being able to be obtained based on the light received by said light-receiving element.

* * * * *

UNITED STATES PATENT AND TRADEMARK OFFICE
CERTIFICATE OF CORRECTION

PATENT NO. : 5,831,720
DATED : November 3, 1998
INVENTOR(S) : Ishida et al.

It is certified that error appears in the above-identified patent and that said Letters Patent is hereby corrected as shown below:

On the title page,

[56] References Cited:

U.S. PATENT DOCUMENTS

"Jelalain et al." should read --Jelalian et al.--.

COLUMN 2:

Line 37, "and" (second occurrence) should be deleted.

COLUMN 7:

Line 37, "measured.," should read --measured,--.

Signed and Sealed this

Twenty-second Day of June, 1999

Attest:

Q. TODD DICKINSON

Attesting Officer

Acting Commissioner of Patents and Trademarks